United States Patent [19]
Fauteux et al.

[11] Patent Number: 5,547,778
[45] Date of Patent: Aug. 20, 1996

[54] CAVITAND ELECTROLYTIC CELL AND ELECTROLYTIC PROCESS

[75] Inventors: Denis G. Fauteux, Acton; Martin Van Buren, Chelmsford; Jie Shi, Arlington, all of Mass.

[73] Assignee: Arthur D. Little, Inc., Cambridge, Mass.

[21] Appl. No.: 502,109

[22] Filed: Jul. 13, 1995

[51] Int. Cl.$^6$ ........................................... H01M 2/38
[52] U.S. Cl. ........................... 429/81; 429/122; 429/137; 429/208; 429/212; 429/216; 205/57; 205/59
[58] Field of Search .......................... 429/81, 122, 208, 429/216, 137, 212; 205/59, 57

[56] References Cited

U.S. PATENT DOCUMENTS 5,434,021  7/1995  Fauteux et al. ..................... 429/216

OTHER PUBLICATIONS

Article Entitled "Molecular Recognition by Self-Assembled Monolayers of Cavitand Receptors" Published in Science, vol. 265 on Sep. 2, 1994 on pp. 1413–1415, authored by K. D. Schierbaum et al.

Primary Examiner—Bruce F. Bell
Attorney, Agent, or Firm—Dick and Harris

[57] ABSTRACT

An electrolytic cell, such as a rechargeable lithium battery, having cavitands associated with a metal ion source-electrode and an electrolyte. The cavitands, which are anchored to the electrode by a polymer leash, are capable of releasably attracting particular ions, such as lithium ions, which are migrating from the electrolyte, toward the surface of the electrode during electrodeposition. The polymer leash serves to continuously maintain the cavitands at a predetermined distance away from the surface of the electrode, regardless of surface area fluctuations, typically caused during deposition and dissolution of the particular ions. Accordingly, the cavitands facilitate substantially uniform electrodeposition of the particular ions, which, in turn, substantially suppresses and/or controls the formation and growth of a passive film or layer, on the electrode surface, which may otherwise promote the formation of dendrites.

18 Claims, 1 Drawing Sheet

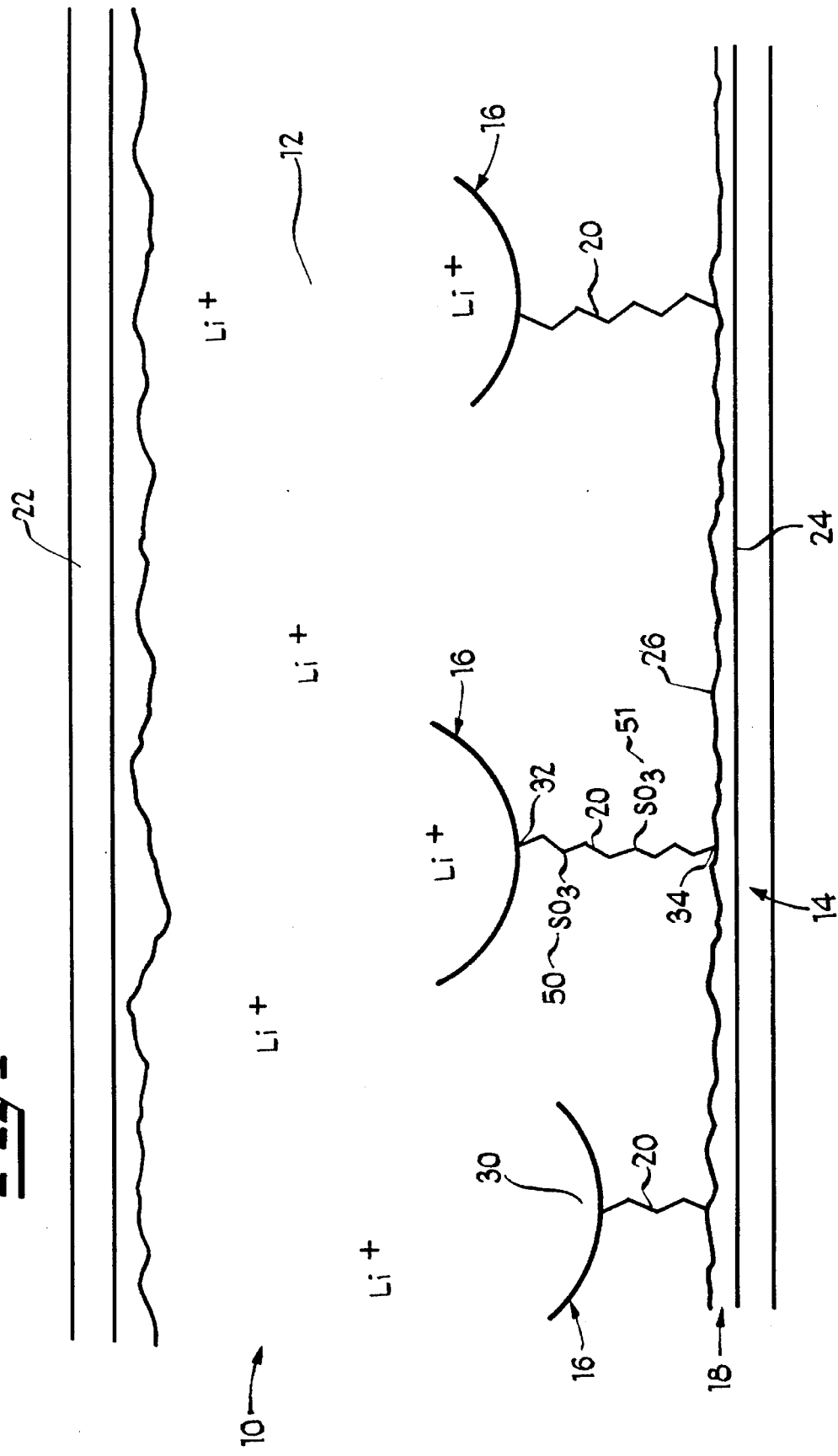

CAVITAND ELECTROLYTIC CELL AND ELECTROLYTIC PROCESS

BACKGROUND OF THE INVENTION

1. Field of the Invention

The present invention relates in general to secondary cells and, more particularly, to an electrolytic cell and electrolytic process associated therewith, wherein the formation and growth of a passive layer is substantially suppressed or controlled through the use of a cavitand.

2. Background Art

Rechargeable, or secondary electrolytic cells, have been known in the art for many years. Furthermore, secondary cells constructed with lithium source anodes have likewise been known in the art. Although such lithium rechargeable batteries have proven to be functional, they have been known to have certain limitations. Indeed, it is well known that the cycle life of such rechargeable lithium batteries may be cut relatively short (compared to other types of secondary cells such as nickel-cadmium) due to the formation and growth on the lithium electrode of a passive film or layer, which promotes, during electrodeposition, the formation of dendrites which typically facilitate the loss of electrochemical activity within the cell and/or internal shorting therewithin. When a lithium carbon electrode is used as the lithium source anode, the formation or growth of the passive film or layer greatly decreases the reversibility of the electrode, limiting its energy density. While various approaches have been implemented in an attempt to suppress passive film formation within an electrolytic cell, most approaches have been directed to electrolyte and surface modifications. In the present invention, cavitands are positioned within an electrolytic cell for purposes of controlling the formation and growth of a passive film or layer, and, in turn, dendritic growth.

While cavitands, in general, have been applied for use in various applications, such as chemically modified field effect transistors for potentiometric detection of charged species and in mass sensitive devices for the detection of neutral molecules, among other places, they have not been applied in an electrolytic cell, let alone used for purposes of controlling the formation and growth of a passive film or layer. Indeed, the unique property of using a cavitand in an electrolytic cell is its ability to preferentially attract ions out of the electrolyte, and to follow (or float above) the surface of the alkali metal electrode and maintain contact with the alkali metal electrode irrespective of changes in the surface volume of the electrode due to electrodeposition.

It is thus an object of the present invention to provide an electrolytic cell and associated process wherein the electrolytic cell includes a cavitand associated with the electrode and the electrolyte.

It is also an object of the present invention to provide an electrolytic cell and associated process wherein the cavitand releasably attracts particular ions, such as lithium ions, which are in the electrolyte.

It is still further an object of the present invention to provide an electrolytic cell wherein the cavitand is anchored to a metal ion source electrode regardless of fluctuations to the surface of the electrode typically caused from deposition and/or dissolution of the particular ions.

It is another object of the present invention to provide an electrolytic cell wherein growth and/or formation of a passive film or layer, on a lithium source electrode, is substantially precluded and/or controlled.

It is also an object of the present invention to provide an electrolytic cell and associated process wherein the particular ions attracted by the cavitand are released from the cavitand and substantially uniformly deposited on the electrode to, in turn, substantially suppress dendritic growth.

These and other objects of the present invention will become apparent in light of the present Specification, Claims and Drawings.

SUMMARY OF THE INVENTION

The present invention comprises an electrolytic cell (or rechargeable battery) having an electrolyte and a metal ion source electrode. The metal ion source electrode has an interface which is operatively positioned between the electrolyte and a surface of the metal ion source electrode. A cavitand is operatively associated with both the electrode and the electrolyte. The cavitand has the ability to releasably attract particular ions within the electrolyte which are associated with the metal ion source electrode. In addition, the cavitand serves to control and/or prevent the formation and/or growth of a passive film, or layer, on the surface of the electrode.

The electrolytic cell includes means for anchoring the cavitand to the metal ion source electrode regardless of fluctuations to the electrode surface due to deposition or dissolution of the particular ions. The electrolytic cell also comprises means for causing the release of the particular ions which have been attracted to the cavitand. Furthermore, the electrolytic cell contains means for directing the released ions from the cavitand toward the metal ion source electrode so as to enable a transfer reaction to occur; at which time the directed ions deposit on the electrode.

In a preferred embodiment of the invention, the electrolytic cell further comprises means for spacing the cavitand at least a predetermined distance away from the metal ion source electrode. This spacing means includes a leash having a first end which is associated with the cavitand and a second end which is associated with the metal ion source electrode, and, more particularly, the anchoring means. It is contemplated that the leash comprise of a polymer capable of coordinating the particular ions therewith.

In a preferred embodiment of the invention, the release means comprises an enhanced electric field proximate the interface wherein the electric field is strong enough to attract the particular ions from the cavitand. The release means may be substantially comprised of a layer of material which is associated with the surface of the metal ion source electrode. It is contemplated that the layer of material form free radicals upon contact with the surface of the metal ion source electrode so as to result in the enhanced electric field thereat. In another preferred embodiment, the layer of material may comprise a compound selected from the group consisting of polynuclear aromatic structures, amines, and ring compounds.

The released ion directing means may also comprise an enhanced electric field which is proximate the interface, to, in turn, direct the particular ions, such as lithium ions, from the cavitand and toward the metal ion source electrode. The directing means and the release means may both comprise the same layer of material, having the same chemical properties, applied to the surface of the metal ion source electrode.

In a preferred embodiment of the invention, the cavitand includes a cavitand cavity. The cavitand cavity includes means for allowing passage of the attracted particular ions through the cavitand cavity, and, in turn, toward and from the surface of the metal ion source electrode.

The invention further comprises an electrolytic process comprising the steps of a) associating the cavitand with an electrolyte; b) anchoring the cavitand to a metal ion source electrode and, in turn, preventing and/or controlling further growth and/or formation of a passive film, or layer, on the surface of the electrode; c) applying a voltage, having a current, across the electrolyte; d) attracting particular ions associated with a metal ion source electrode, within the electrolyte, to the cavitand; e) enhancing an electric field adjacent a surface of a metal ion source electrode; f) releasing the particular ions which have been attracted to the cavitand; g) directing the particular ions toward the metal ion source electrode as a result of the enhanced electric field; and h) depositing the electrode with the particular ions. It is also contemplated that the electrolytic process further comprise the steps of: i) spacing the cavitand at least a predetermined distance away from the metal ion source electrode; and j) maintaining the predetermined spacing regardless of fluctuations in the surface of the metal ion source electrode due to deposition or dissolution.

In a preferred embodiment of the electrolytic process the step of releasing the particular ions from the cavitand occurs as a result of the attraction of the particular ions toward the enhanced electric field. Furthermore, the step of directing the particular ions from the cavitand occurs as a result of the attractions between the particular ions toward the enhanced electric field.

Also in a preferred embodiment of the electrolytic process, the step of enhancing the electric field adjacent the surface of the metal ion source electrode comprises the steps of: a) applying a layer of material to the surface of the metal ion source electrode; and b) forming free radicals upon contact of the layer of material with the surface of the metal ion source electrode to, in turn, result in the enhanced electric field.

In another preferred embodiment of the electrolytic process, the step of releasing the particular ions from the cavitand includes releasing the particular ions through the cavitand and, in turn, toward and from the surface of the metal ion source electrode.

BRIEF DESCRIPTION OF THE DRAWINGS

FIG. 1 is a diagram of the present electrolytic cell invention showing, in particular, cavitands assembled on an alkali metal electrode.

BEST MODE FOR PRACTICING THE INVENTION

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Electrolytic cell 10 is shown in FIG. 1 as including electrolyte 12, metal ion source electrode 14, cavitand 16, anchoring means 18, release means and released ion directing means (which, as will be explained in greater detail, may be integrally associated with anchoring means 18) and spacing means 20. For purposes of explanation of the present invention, metal ion source electrode 14, may be described as a lithium source anode for use in a rechargeable electrolytic cell/battery. However, it will be understood to those with ordinary skill in the art that the principals associated with the claimed and described invention would also be applicable for use with a cathode, such as cathode 22, as well as with respect to other types of alkali metal ion source electrodes.

Metal ion source electrode (lithium anode) 14 includes surface 24 and interface 26 located adjacent electrolyte 12 and surface 24 of the electrode. The surface of the electrode is shown as including anchoring means 18, which, in a preferred embodiment, comprises a layer of material having an enhanced electric field strong enough to attract the particular ions (i.e. lithium ions) from cavitand 16 and eventually toward electrode 14. Such a layer of material may comprise naphthalene, which forms free radicals upon contact with surface 24 of the particular alkali metal electrode 14. Although naphthalene has been identified as one particular compound applicable in the present invention, it is also contemplated that other compounds, such as polynuclear aromatic structures, amines and ring compounds, among others, also be used as the layer of material which comprises the anchoring means 18, the release means and the released ion directing means—provided such other compounds exhibit the above-referred to enhanced electric field.

Cavitand 16, which includes cavitand cavity 30, is attached to anchoring means 18 via spacing means 20. Spacing means 20, maintains the associated cavitands at a predetermined distance away from metal ion source electrode 14 regardless of fluctuation to surface 24 which typically result from deposition or dissolution of the particular ions. Spacing means 20 includes first end 32 and second end 34. As can be seen, the first end of the spacing means is associated with cavitand 16 and the second end is associated with electrode 14, and, more particularly, with anchoring means 18.

Spacing means 20 may comprise a polymer leash capable of coordinating the particular ions, such as lithium ions, with the leash. For example, it may be desirable to construct a leash wherein various locations 50, 51 thereon exhibit a releasable attraction for the particular ions of concern. Of course, the attraction would not be greater than that of the enhanced electric field at the anchoring means. However, such a leash, in combination with the release means, would contribute to the guidance/directing of the particular ions along a predetermined path from the cavitand toward the surface of the electrode. While such attraction locations 50, 51, are shown as comprising a sulfonate operatively linked to the polymer leash, other compounds having similar attraction/guiding capabilities, are also contemplated for use.

In operation, surface layer 18 is applied to alkali metal ion source electrode 14 using known application techniques. After the surface layer is applied, electrode/anode 14 will have been fabricated. Actual completion of electrolytic cell 10, absent cavitand 16 and spacing means 20, will likewise be fabricated using known techniques. With respect to the cavitands, it is contemplated that they comprise cyclodextrin molecules—although other conventional substances which would have a releasable affinity for the particular ions of concern, and which would be in substantial chemical equilibrium with the particular electrolyte and electrode, as would be understood to those with ordinary skill in the art, are also contemplated for use.

Either prior to, or after fabrication of the electrode and electrolyte, cavitand 16 and spacing means 20 will be operatively inserted within the electrolyte. Of course, it is also contemplated that the cavitand and spacing means be inserted into the electrode surface layer, as opposed to directly into the electrolyte, followed by association with the electrolyte after complete assembly of the electrolytic cell. As will be understood to those with ordinary skill in the art, and as explained in the prior art with respect to cavitands in general (see for example, Schierbovm, K. D. et al., *Molecular Recognition by self-assembled Monolayers of Cavitand Receptors,* 265 Science 1413, (Sep. 2, 1994)), the cavitand and spacing means will self assemble so that the cavitand is secured to the layer of material (anchoring means) 18, at a predetermined spaced distanced away from electrode 14.

After electrolytic cell 10, including the fully assembled cavitands and associated spacing means, have been fabricated, a voltage, having a current, is applied across electrolyte 12. This current will cause ions, such as lithium ions, within the electrolyte to begin to migrate toward electrode 14 during the recharging cycle.

It should be noted, that in prior art rechargeable batteries, the migrating ions would be attracted to that portion of the particular electrode having the highest electrical potential. Indeed, such high electrical potential is typically the result of "peaks" formed on the electrode surface as a result of non-uniform stripping and, in turn, non-uniform electrodeposition. In addition, such peaks are also formed as a result of the formation and continued growth of a passive film, or layer, on the surface of the electrode as a result of a chemical reaction between the electrolyte and, for example, the lithium in the electrode. As the passive layer continues to grow (such as occurs in prior art devices), native peaks existing on the surface of the electrode become higher as a result of this passive layer "build-up"—thereby increasing the electrical potential at those "increased" peaks. As is known in the art, these "peaked" regions thereby attract more of the ions during electrodeposition than the lower regions of the electrode surface, which, in turn, result in the formation of dendritic growth thereon. However, in the present invention, such a formation and growth of a passive film or layer, and, in turn, dendrite growth, is substantially suppressed and/or controlled as a result of the cavitands. Indeed, these cavitands facilitate a more uniform distribution of the ions during electrodeposition.

The cavitands are positioned across the electrode 14 at a predetermined distance away from the interface by spacing means 20. As the ions begin to migrate toward surface 24 of electrode 14, the ions, as known in the prior art, become attracted to the peaks/high electrical potential created by the non-uniform dissolution of ions at the electrode, or which may exist due to the electrode or electrode active material initially having a non-uniform surface area.

The operative positioning of the cavitands (between the enhanced electric field of surface layer 18 and a substantial quantity of the migrating ions of concern), serve to substantially inhibit the formation, or increase, of dendritic peaks by intercepting the particular ions, through releasable attraction of the particular ions to the cavitands, or by actually "catching" the ions within cavitand cavity 30. Such an interception of the particular ions thereby precludes a funneling effect—whereby the migrating ions, located within and across the electrolyte, would otherwise be attracted directly toward and to the peaks of the electrode surface—typically resulting in the continued formation of dendritic growth. However, when the cavitands of the present invention are operatively oriented within the electrolytic cell, the operative and "floating" orientation of the cavitands, relative to the electrode surface, will facilitate a more uniform distribution of the particular ions onto the surface of the electrode during deposition—thereby substantially precluding dendritic growth while also continuing to suppress and/or control the formation and growth of a passive film or layer on the surface of the electrode. Indeed, such a "floating" orientation of the cavitands is achieved as a result of the anchoring of the cavitands to surface layer 18 (by spacing means 20). Inasmuch as the surface layer (anchoring means) substantially conforms to the surface area of the electrode during dissolution and deposition, and inasmuch as the spacing means themselves serve as a leash having a defined length, the cavitands will continuously be maintained at a predetermined distance away from the surface of the electrode regardless of fluctuations to the surface of the electrode. Accordingly, the cavitands will generally be restrained in an "ion intercepting" orientation toward facilitated uniform deposition of the particular ions.

After the particular ions have been intercepted by the cavitands, the ion releasing means, which are at least partially associated with the imposed electric field created by anchoring means 18, attracts and directs the ions out of or away from the cavitands and, in turn, toward surface 24 of electrode 14. Additional release and directing of the particular ions from the cavitands, toward substantial uniform deposition on electrode 14, is further contemplated through another imposed electric field associated with spacing means 20. Indeed, and as previously explained, spacing means 20 may include various locations 50, 51 having sulfonates linked therewith. These locations are thus capable of attracting the particular ions from the cavitands. However, inasmuch as the electric field at the electrode surface will be greater than the electric field at the sulfonates locations, the particular ions will actually follow a path, to the electrode surface, along the sulfonates locations on the spacing means. The ions, once at the electrode surface, then engage in a charge transfer reaction and are subsequently deposited onto the electrode in a substantially uniform manner.

The foregoing description and drawings merely explain and illustrate the invention and the invention is not so limited except insofar as the appended claims are so limited, as those skilled in the art who have the disclosure before them will be able to make modifications and variations therein without departing from the scope of the invention.

We claim:

1. An electrolytic cell comprising:

an electrolyte;

a metal ion source electrode having an interface operatively positioned between the electrolyte and a surface of the metal ion source electrode;

a cavitand operatively associated with the electrode and the electrolyte, the cavitand having the ability to releasably attract particular ions, associated with the metal ion source electrode, within the electrolyte;

means for anchoring the cavitand to the metal ion source electrode regardless of fluctuations to the electrode surface due to deposition, or, dissolution of the particular ions;

means for causing the release of the particular ions which have been attracted to the cavitand; and means for directing the released ions from the cavitand toward the metal ion source electrode enabling a charge transfer reaction to occur, wherein the directed ions consequently deposit on the electrode.

2. The electrolytic cell according to claim 1, further comprising means for spacing the cavitand at least a set distance away from the metal ion source electrode.

3. The cavitand spacing means according to claim 2, including a leash having a first end associated with the cavitand and a second end associated with the metal ion source electrode.

4. The cavitand spacing means according to claim 3, wherein the second end of the leash is associated with the anchoring means.

5. The electrolytic cell according to claim 3, wherein the leash comprises a polymer which coordinates the particular ions with the leash.

6. The electrolytic cell according to claim 1, wherein the release means comprises an enhanced electric field proximate the interface, wherein the electric field is strong enough to attract the particular ions from the cavitand.

7. The electrolytic cell according to claim 6, wherein the release means comprises a layer of material associated with the surface of the metal ion source electrode, wherein the layer of material forms free radicals upon contact with the surface of the metal ion source electrode.

8. The electrolytic cell according to claim 6, wherein the release means comprises a compound selected from the group consisting of polynuclear aromatic structures, amines and ring compounds.

9. The electrolytic cell according to claim 1, wherein the released ion directing means comprises an enhanced electric field proximate the interface wherein the electric field directs the particular ions from the cavitand toward the metal ion source electrode.

10. The electrolytic cell according to claim 9, wherein the released ion directing means comprises a layer of material associated with the surface of the metal ion source electrode, wherein the layer of material forms free radicals upon contact with the surface of the metal ion source electrode.

11. The electrolytic cell according to claim 9, wherein the released ion directing means comprises a compound selected from the group consisting of polynuclear aromatic structures, amines, and ring compounds.

12. The electrolytic cell according to claim 1, wherein the cavitand includes a cavitand cavity:

the cavitand cavity including means for allowing the passage of the attracted particular ions through the cavitand cavity and, in turn, toward and from the surface of the metal ion source electrode.

13. An electrolytic process comprising the steps of:

associating a cavitand with an electrolyte;

anchoring the cavitand to a metal ion source electrode and, in turn, controlling formation and growth of a passive film, or layer, on the metal ion source electrode;

applying a voltage having a current across the electrolyte;

attracting particular ions, associated with the metal ion source electrode, within the electrolyte, to the cavitand;

enhancing an electric field adjacent a surface of the metal ion source electrode;

releasing the particular ions which have been attracted to the cavitand;

directing the released particular ions toward the metal ion source electrode as a result of the enhanced electric field; and depositing the electrode with the particular ions.

14. The electrolytic process according to claim 13, further comprising the steps of:

spacing the cavitand at least a set distance away from the metal ion source electrode; and maintaining the set spacing regardless of fluctuations in the surface of the metal ion source electrode due to deposition, or, dissolution.

15. The electrolytic process according to claim 13, wherein the step of releasing the particular ions from the cavitand occurs as a result of the attraction of the particular ions toward the enhanced electric field.

16. The electrolytic process according to claim 13, wherein the step of directing the particular ions from the cavitand occurs as a result of attraction of the particular ions toward the enhanced electric field.

17. The electrolytic process according to claim 13, wherein the step of enhancing an electric field adjacent the surface of the metal ion source electrode comprises the steps of:

applying a layer of material to the surface of the metal ion source electrode;

forming free radicals within the layer of material upon contact with the surface of the metal ion source electrode, to, in turn, result in the enhanced electric field.

18. The electrolytic process according to claim 13, wherein the step of releasing the particular ions from the cavitand includes the step of releasing the particular ions through the cavitand and, accordingly, toward and from the electrode.

* * * * *